(12) United States Patent
De Lega et al.

(10) Patent No.: US 7,212,291 B2
(45) Date of Patent: May 1, 2007

(54) INTERFEROMETRIC MICROSCOPY USING REFLECTIVE OPTICS FOR COMPLEX SURFACE SHAPES

(75) Inventors: Xavier Colonna De Lega, Middletown, CT (US); Charles McFee, Glastonbury, CT (US)

(73) Assignee: Zygo Corporation, Middlefield, CT (US)

( * ) Notice: Subject to any disclaimer, the term of this patent is extended or adjusted under 35 U.S.C. 154(b) by 270 days.

(21) Appl. No.: 11/017,632

(22) Filed: Dec. 20, 2004

(65) Prior Publication Data

US 2005/0134863 A1 Jun. 23, 2005

Related U.S. Application Data

(60) Provisional application No. 60/530,498, filed on Dec. 18, 2003.

(51) Int. Cl.
*G01B 9/02* (2006.01)
(52) U.S. Cl. ..................................... 356/512
(58) Field of Classification Search ........ 356/511–516, 356/521
See application file for complete search history.

(56) References Cited

U.S. PATENT DOCUMENTS

| | | | |
|---|---|---|---|
| 4,340,306 A | 7/1982 | Balasubramanian | 356/360 |
| 4,387,994 A | 6/1983 | Balasubramanian | 356/513 |
| 4,725,144 A | 2/1988 | Nelson et al. | 356/360 |
| 4,743,117 A | 5/1988 | Kitabayashi et al. | 356/520 |
| 4,872,755 A | 10/1989 | Küchel | 356/360 |
| 4,898,470 A | 2/1990 | Cleaveland | 356/513 |
| 5,293,214 A | 3/1994 | Ledger | 356/355 |
| 5,398,113 A | 3/1995 | de Groot | 356/360 |
| 5,485,275 A | 1/1996 | Ohtsuka | 356/513 |
| 5,784,164 A | 7/1998 | Deck et al. | 356/359 |
| 5,991,035 A | 11/1999 | Bruning | 356/359 |

(Continued)

FOREIGN PATENT DOCUMENTS

WO   WO 01/27558   4/2001

(Continued)

OTHER PUBLICATIONS

Boppart et al., "Forward-imaging instruments for optical coherence tomography", *Optics Letters*, vol. 22, No. 21, pp. 1618-1620 (Nov. 1, 1997).

(Continued)

*Primary Examiner*—Hwa (Andrew) Lee
(74) *Attorney, Agent, or Firm*—Fish & Richardson P.C.

(57) ABSTRACT

An apparatus including: (i) an interferometer positioned to derive measurement and reference wavefronts from a source of electromagnetic radiation, wherein the interferometer is configured to direct the measurement wavefront to reflect from a measurement surface and the reference wavefront to reflect from a reference surface, and further directs reflected measurement and reflected reference wavefronts to overlap with one another and to form an interference pattern; (ii) an auxiliary optic having a curved reflective surface positioned to redirect the measurement wavefront between the interferometer and the measurement surface; and (iii) a translation stage, wherein paths for the measurement and reference wavefronts define an optical measurement surface corresponding to a theoretical test surface that would reflect the measurement wavefront to produce a zero optical path length difference between the measurement and reference wavefronts, and wherein the translation stage is configured to scan the optical measurement surface over the measurement surface.

30 Claims, 19 Drawing Sheets

U.S. PATENT DOCUMENTS

| | | | | |
|---|---|---|---|---|
| 6,154,279 | A | 11/2000 | Thayer | 356/376 |
| 6,195,168 | B1 | 2/2001 | De Lega et al. | 356/497 |
| 6,312,373 | B1 * | 11/2001 | Ichihara | 356/515 |
| 6,714,307 | B2 * | 3/2004 | De Groot et al. | 356/512 |
| 6,879,402 | B2 * | 4/2005 | Kuchel | 356/513 |
| 2001/0028462 | A1 | 10/2001 | Ichihara et al. | 356/512 |
| 2003/0011783 | A1 | 1/2003 | Suzuki et al. | 356/512 |
| 2003/0043385 | A1 | 3/2003 | Kuchel | 356/513 |

FOREIGN PATENT DOCUMENTS

| | | |
|---|---|---|
| WO | WO 01/75395 | 10/2001 |
| WO | WO 02/14845 | 2/2002 |

OTHER PUBLICATIONS

Blümel et al., "Absolute interferometric calibration of toric and conical surfaces", *SPIE*, vol. 3134, pp. 370-378 (Jul 1997).

Brinkman et al., "Testing of rod objects by grazing-inidence interferometry: experiment", *Applied Optics*, vol. 38, No. 1, pp. 121-125 (Jan. 1, 1999).

Chakmakjian et al., "Simultaneous focus and coherence scanning in interference microscopy", *Technical Digest, International Workshop on Interferometry*, 171 (Riken, Japan, 1996).

Dresel et al., "Three-dimensional sensing of rough surfaces by coherence radar", *Applied Optics*, vol. 31, No. 7, pp. 919-925 (Mar. 1, 1992).

Li et al., "Imaging needle for optical coherence tomography", *Optics Letters*, vol. 25, No. 20, pp. 1520-1522 (Oct. 15, 2000).

Lindner et al., "White-light interferometry via an endoscope", *SPIE*, vol. 4777, pp. 90-101 (Jul. 2002).

Matthys et al., "Panoramic Holointerferometry", *Experimental Mechanics*, vol. 35, No. 1, pp. 83-88 (Mar. 1995).

Schwider, "White-light Fizeau interferometer", *Applied Optics*, vol. 36, No. 7, pp. 1433-1437 (Mar. 1, 1997).

Zhou et al., "Surface profile measurements using a white light Linnik interferometer", *Annual Report Lehrstuhl für Optik, Univ. Elrlangen-Nümberg* pp. 69 (1996).

\* cited by examiner

INTERFEROMETRIC MICROSCOPY USING REFLECTIVE OPTICS FOR COMPLEX SURFACE SHAPES

CLAIM OF PRIORITY

This application claims priority under 35 USC §119(e) to Provisional Patent Application No. 60/530,498, entitled "INTERFEROMETRIC MICROSCOPY USING REFLECTIVE OPTICS FOR COMPLEX SURFACE SHAPES," filed Dec. 18, 2003, the entire contents of which are hereby incorporated by reference.

TECHNICAL FIELD

This invention relates to optical metrology.

BACKGROUND

A common challenge for manufacturers is precise measurement of surface topography. Examples of manufactured items requiring metrology are engine parts, components for magnetic storage devices, flat-panel displays, molded and textured plastic surfaces, mechanical pump surfaces and seals, and minted coins. In these and other Industrial Markets, there is a significant and growing need for fast, accurate metrology of parts having non-flat prismatic surfaces. These parts include three-dimensional (3D) cones, cylinders, and spheres, often having surfaces as small as 2 mm in diameter and 75 mm deep with 3D form tolerances of as low as 0.5 μm. An important example is fuel system valves, which are fundamental building blocks in engines, pumps and other hydraulic systems. Manufacturing the conical form of these parts within tolerance specifications is a high priority. For instance, the roundness of valve seats is important to valve function as it relates closely to leakage—a valve seat not conforming to specified roundness would likely yield a leaky valve. Additionally, many of these surfaces are deeply recessed within narrow cylindrical holes, making precise metrology even more challenging.

Presently, most measurements on fuel system components are mechanical or tactile (e.g., stylus gages). There is a strong interest in this industry to transition to optical techniques, for example by using interferometry, which can improve throughput, data density and uncertainty compared with mechanical techniques. One key advantage of optics is the "3D" aspect of the surface measurement, as opposed to the linear trace of a stylus gage. However, many industrial surfaces such as interior cones are difficult to measure optically, because of their unusual shape and surface texture, when compared to the usual optical testing samples such as mirrors, prisms and lenses.

SUMMARY

In general, in one aspect, the invention features an apparatus including: (i) an interferometer positioned to derive measurement and reference wavefronts from a source of electromagnetic radiation, wherein the interferometer is configured to direct the measurement wavefront to reflect from a measurement surface and the reference wavefront to reflect from a reference surface, and further directs reflected measurement and reflected reference wavefronts to overlap with one another and to form an interference pattern; (ii) an auxiliary optic having a curved reflective surface positioned to redirect the measurement wavefront between the interferometer and the measurement surface; and (iii) a translation stage. Paths for the measurement and reference wavefronts define an optical measurement surface corresponding to a theoretical test surface that would reflect the measurement wavefront to produce a zero optical path length difference between the measurement and reference wavefronts. The translation stage is configured to scan the optical measurement surface over the measurement surface.

Embodiments of the apparatus may include any of the following features.

The curved reflective surface of the auxiliary optic may cause the optical measurement surface to have a locally spherical portion. Furthermore, the translation stage may be configured to vary a radius of curvature of the locally spherical portion of the optical measurement surface to contact the measurement surface. The apparatus may further include the source of the electromagnetic radiation, wherein the source defines a coherence length for the electromagnetic radiation, and wherein the translation stage is configured to vary the radius of curvature over a distance greater than the coherence length of the source.

More generally, the apparatus may include the source of the electromagnetic radiation.

The apparatus may further include a detector positioned to detect the interference pattern.

The curved reflective surface of the auxiliary optic may be a spherical surface.

The curved reflective surface of auxiliary optic may be positioned to redirect the measurement wavefront in a direction having a component back to the interferometer. For example, the auxiliary optic may be supported on a pedestal configured to slide into a guiding bore of a test part having the measurement surface. The measurement surface may be a conical surface positioned above the guiding bore between the curved reflective surface and the interferometer.

The translation stage may be further configured to scan the optical measurement surface to contact the curved reflective surface of the auxiliary optic. Information from such a scan may be used to provide information about the position and curvature of the auxiliary optic relative to the measurement surface.

The auxiliary optic may be configured to rest within a recess of a test part having the measurement surface. The auxiliary optic may be shaped relative to the recess to self-center in the recess. For example, the auxiliary optic may be a ball.

The interferometer may include an interference objective, and the translation stage may be configured to translate the interference objective relative to the auxiliary optic. For example, the translation stage is configured to translate the interference objective. Alternatively, the translation stage may be configured to translate the auxiliary optic. The interference objective may be a Mirau interference objective or a Michelson interference objective.

The translation stage may be configured to translate the auxiliary optic relative to the measurement surface.

In general, in another aspect, the invention features an apparatus including: (i) a source of electromagnetic radiation, wherein the source defines a coherence length for the electromagnetic radiation; (ii) a detector; (iii) an interferometer having an interference objective positioned to derive measurement and reference wavefronts from a source of electromagnetic radiation, wherein the interference objective is configured to direct the measurement wavefront to reflect from a measurement surface and the reference wavefront to reflect from a reference surface, and wherein the interferometer directs reflected measurement and reflected reference wavefronts to overlap with one another and to form an interference pattern on the detector; (iv) an auxiliary optic having a curved reflective surface positioned to redirect the measurement wavefront between the interferometer and the measurement surface; and (v) a translation stage. Paths for the measurement and reference wavefronts define an optical measurement surface corresponding to a theoretical test surface that would reflect the measurement wavefront to produce a zero optical path length difference between the measurement and reference wavefronts. The curved reflective surface of the auxiliary optic causes the optical measurement surface to have a locally spherical portion. The translation stage is configured to translate the interference objective relative to the auxiliary optic to vary a radius of curvature of the locally spherical portion of the optical measurement surface to contact the measurement surface and to vary the radius of curvature over a distance greater than the coherence length of the source.

In general, in another aspect, the invention features, a method including: (i) directing a measurement wavefront to reflect from a measurement surface and a reference wavefront to reflect from a reference surface, the measurement and reference wavefronts being derived from a common source of electromagnetic radiation; (ii) directing the reflected measurement and reference wavefronts to overlap with one another and form an interference pattern, wherein paths for the measurement and reference wavefronts define an optical measurement surface corresponding to a theoretical test surface that would reflect the measurement wavefront to produce a zero optical path length difference between the measurement and reference wavefronts; and (iii) varying the radius of curvature of a locally spherical portion of the optical measurement surface to contact the measurement surface, and detecting the interference pattern as a function of the radius of curvature. An auxiliary optic having a curved reflective surface is used to redirect the measurement wavefront to the measurement surface.

Embodiments of the method may include any of the following features.

The optical measurement surface may contact a conical portion of the measurement surface.

The source may define a coherence length for the electromagnetic radiation, wherein the radius of curvature is varied over a range larger than the coherence length of the source.

The radius of curvature may be varied by translating an interference objective used to generate the measurement and reference wavefronts relative to the auxiliary optic.

The method may further include passing the auxiliary optic into a guiding bore of a test part having the measurement surface. For example, the measurement surface may be a conical surface positioned above the guiding bore between the curved reflective surface and the interferometer.

The method may further including scanning the optical measurement surface to contact the curved reflective surface of the auxiliary optic. Information from such a scan may be used to provide information about the position and curvature of the auxiliary optic relative to the measurement surface.

The method may further include resting the auxiliary optic within a recess of a test part having the measurement surface to self-center the auxiliary optic relative to the measurement surface. For example, the auxiliary optic may be a ball.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety. In case of conflict, the present specification, including definitions, will control. In addition, the systems, methods, and examples are illustrative only and not intended to be limiting.

Other features and advantages of the invention will be apparent from the following detailed description, and from the claims.

DESCRIPTION OF DRAWINGS

Like reference symbols in the various drawings indicate like elements.

DETAILED DESCRIPTION OF PREFERRED EMBODIMENTS

Figure 1:
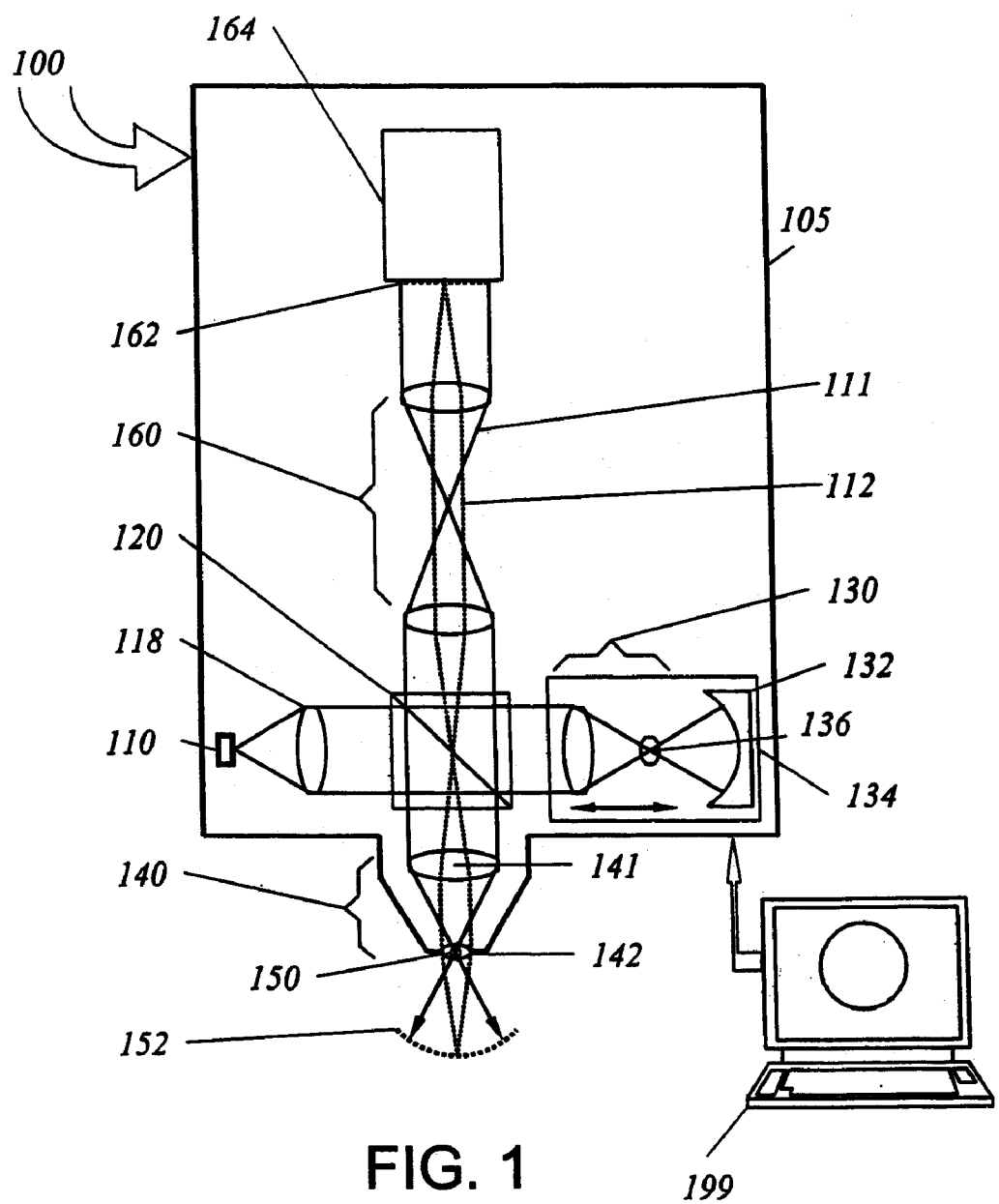
FIG. 1 is a schematic diagram of a sensor based on a Linnik interferometer with a scanning reference assembly.

Disclosed herein are interferometry methods and systems for measuring complex surface shapes such as internal cones. The most common internal cones requiring precision metrology are one-half of a valve system. The mating part of the valve is generically one of three types: a ball; a mating cone (usually of a slightly more acute angle than the internal cone, and sometimes segmented); and a cylinder (often having a slight taper at the intended contact region with the cone). In each case, "roundness" of the internal cone is important because of the contact surface area between the cone and the mating part. Roundness refers to the deviation of the conical surface from an ideal sphere sitting in the cone at the diameter of contact. This is what gages (in conjunction with other inputs) consistent pressure in the system, accuracy of the duration of the fuel pulse, and leakage (dripping).

The valve contact surface may be thought of as a pie plate with the bottom knocked out. This picture of the contact surface is generally valid for all three types of mating part. For all valve types, the roundness of the contact surface is very important. For cones that mate with other cones, the cone angle and straightness of the contact surface are also very important.

Typically, critical cone surface form characteristics are those that would cause leakage when mated with a ball or similar movable part. Thus, a measurement of most interest to manufacturers of these parts is how the cone surface deviates from the ideal as viewed, e.g., by an imaginary sphere nominally placed at the same position as the actual mating ball of the valve. Therefore, an ideal metrology technique would evaluate the deviation of the conical surface shape (or other complex surface shapes) with respect to a sphere centered on an optical datum point located near the cone axis at a position such that an annular cone-shaped segment of the surface is viewed at near normal incidence from the center of the sphere.

Conical surfaces (and other complex surface shapes) can be interferometrically characterized using a locally spherical measurement wavefront (e.g., spherical and aspherical wavefronts). In particular, complex surface shapes are measured relative to a measurement point datum. This is achieved by varying the radius of curvature of a virtual surface corresponding to a theoretical test surface that would reflect a measurement wavefront to produce a constant optical path length difference (e.g., zero OPD) between the measurement and reference wavefronts. This virtual surface is referred to as an optical measurement surface. The radius of curvature of the optical measurement surface can be varied by scanning the OPD in a telecentric portion of the interferometer.

For parts having conical surfaces, the point datum emulates the center of a mating sphere. By scanning the radius of curvature of the optical measurement surface so it tangentially contacts the conical surface, one can measure the gap between the part surface and the optical measurement surface.

Preferably, systems should be configured to satisfy two conditions for optimal measurements using this technique. Firstly, the optical measurement surface should locally match the part surface. In other words, the optical measurement surface should tangentially contact a portion of the part surface. This enables the system to interferometrically measure the part in a direction normal to the part surface. As a result, the lateral calibration of the image pixels is not sensitive, at least to first order, to the 3D nature of the object surface. Likewise, the lateral resolution of the imaging detector does not compromise (at least to first order) the accuracy of the interferometric distance measurement. This is important because the lateral image resolution of an interference microscope is generally 1000 times inferior to the height resolution of the interferometric measurement. Furthermore, the optimal configuration for collecting light reflected by the part surface results when the optical measurement surface tangentially contacts the part surface, which amounts to illuminating and collecting light along the local part normal.

Secondly, the part surface should be in focus with respect to a downstream detector. This optimizes lateral resolution (i.e., in the plane of the part surface) and interference fringe contrast. This condition also reduces measurement sensitivity to the slope of the part surface.

Interferometry systems using this technique can be controlled by e.g., a computer. To measure a portion of a part surface, the computer continuously varies the radius of the optical measurement surface without moving the point datum. As the measurement surface contacts the part surface, the computer records the location of these points of intersection with respect to the optical point datum while acquiring images of corresponding interference patterns via a detector. Using an algorithm, the computer reconstructs and analyzes the part surface.

Embodiments disclosed for generating the radius of curvature scan of the optical measurement surface include refractive optics either in a fixed or translatable configuration. Furthermore, in additional embodiments, an auxiliary optic having a curved reflective surface can be adapted a conventional interference objective to provide a radius of curvature scan of a locally spherical optical measurement surface. The conventional interference objective may be, for example, of the Michelson or Mirau type.

FIG. 1 shows an embodiment of an optical sensor 100 housed in an enclosure 105. Sensor 100 includes an interferometer, which consists of a beam splitter 120, measurement optics 140 and reference optics 130. A light source 110 (e.g., a low-coherence source such as a halogen bulb, light emitting diode (LED), super-luminescent diode (SLD)) illuminates reference optics 130 and measurement optics 140 with respective measurement and reference wavefronts via an illuminator lens 118 and beam splitter 120. Measurement and reference wavefronts reflect from a measurement surface (not shown) and a reference mirror 132. At an image plane, imaging optics 160 image reflected measurement and reference wavefronts to a flat-field image plane 162. A CCD camera 164 detects the imaged wavefronts at flat-field image plane 162.

The interferometer is similar to a Linnik interferometer, in which reference optics 130 essentially duplicate the measurement optics 140 to compensate for chromatic dispersion and optical aberrations. Measurement optics 140 are specifically designed to generate a locally spherical measurement wavefront in object space, centered on a measurement datum point 150, such that a chief ray 111 passes through measurement datum point 150. In this case, datum point 150 is also the pupil of measurement optics 140. Measurement optics 140 includes an objective lens 141 and a collimating lens 142. Collimating lens 142 focuses the marginal rays while increasing the numerical aperture of measurement optics 140, which through imaging optics 160 image marginal ray 112 to flat-field image plane 162. While measurement optics 140 include two lenses, more generally measurement optics can include fewer (e.g., a single lens) or more optical components. Similarly, while reference optics 130 includes two lenses; in other implementations reference optics can include fewer or more optical components. Furthermore, in other embodiments the reference optics are omitted entirely, and curved reference mirror 132 is replaced with a planar reference mirror. However, in this latter embodiment, chromatic dispersion and optical aberrations in the measurement optics may not be compensated. In this case, additional optical components can be included between beamsplitter 120 and the planar reference mirror to compensate for measurement optics 140. Such optical components can include, e.g., one or more properly chosen parallel glass plate(s), or an afocal telecentric system with dispersion matching the dispersion introduced by measurement optics 140.

Reference optics 130 focus the reference wavefront to a reference focal point 136. Thereafter, the reference wavefront contacts curved reference mirror 132, whose curvature matches the expanding reference wavefront and reflects the reference wavefront back towards beam splitter 120. Reference optics 130 and reference mirror 132 are mounted on a translation stage 134, which translates reference focal point 136 relative to beamsplitter 120. Translating reference focal point 136 varies the optical path difference (OPD) between the measurement and reference wavefronts. By translating reference optics 130 with reference mirror 132, translation stage 134 varies the OPD in a telecentric portion of the interferometer.

Paths for the measurement and reference wavefronts define an optical measurement surface 152 corresponding to a theoretical test surface that would reflect the measurement wavefront to produce a constant OPD between the measurement and reference wavefronts. In the present embodiment, reference mirror 132 is arranged so optical measurement surface 152 corresponds the surface of zero OPD between the measurement and reference wavefronts. Measurement surface 152 therefore represents the instantaneous locus of zero OPD points in space, with all points in focus at a nominal radius of curvature, at least substantially over a limited range of ray angles. Optical measurement surface 152 coincides with a focal surface of measurement optics 140 and imaging optics 160. Accordingly, a measurement surface coincident with optical measurement surface 152 is imaged to flat-field image plane 162 and also produces reflected measurement wavefronts that have a zero OPD with reference wavefronts reflected from reference mirror 132.

Sensor 100, under control of a computer 199, accepts electronic intensity data from camera 164 while varying the OPD by scanning translation stage 134. Adjusting the reference beam path length changes the radius of curvature for measurement surface 152, effectively scanning a measurement area with respect to measurement point datum 150, like an inflating balloon, while datum point 150 remains substantially fixed.

Figure 2A:
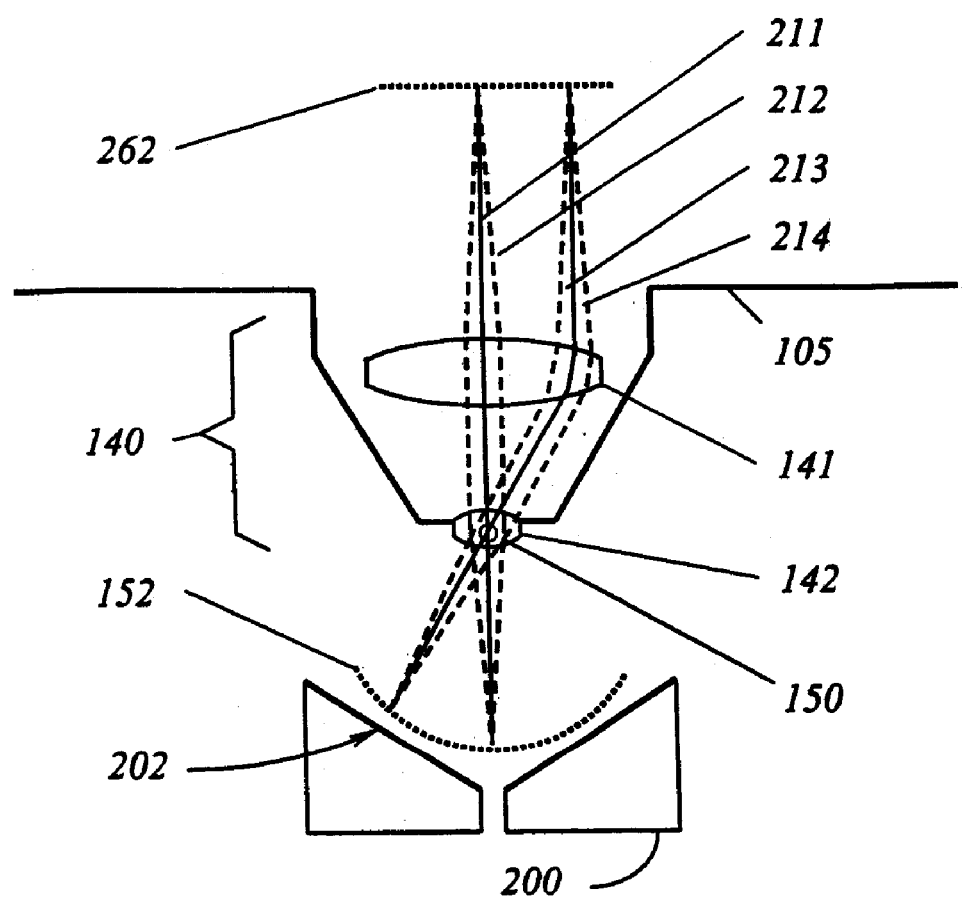
FIG. 2(a) shows detail of the measurement optics of the sensor shown in FIG. 1.

FIG. 2(a) shows measurement optics 140 in greater detail, arranged so as to measure a conical part surface 202 for a part 200, shown here in cross section. Note that chief rays 211 and 213 both pass through measurement datum point 150 near the center of collimating lens 142. Collimating lens 152 focuses marginal rays 212 and 214 from reflected from measurement surface 152 back to a substantially flat intermediate real image 262.

Figure 2B:
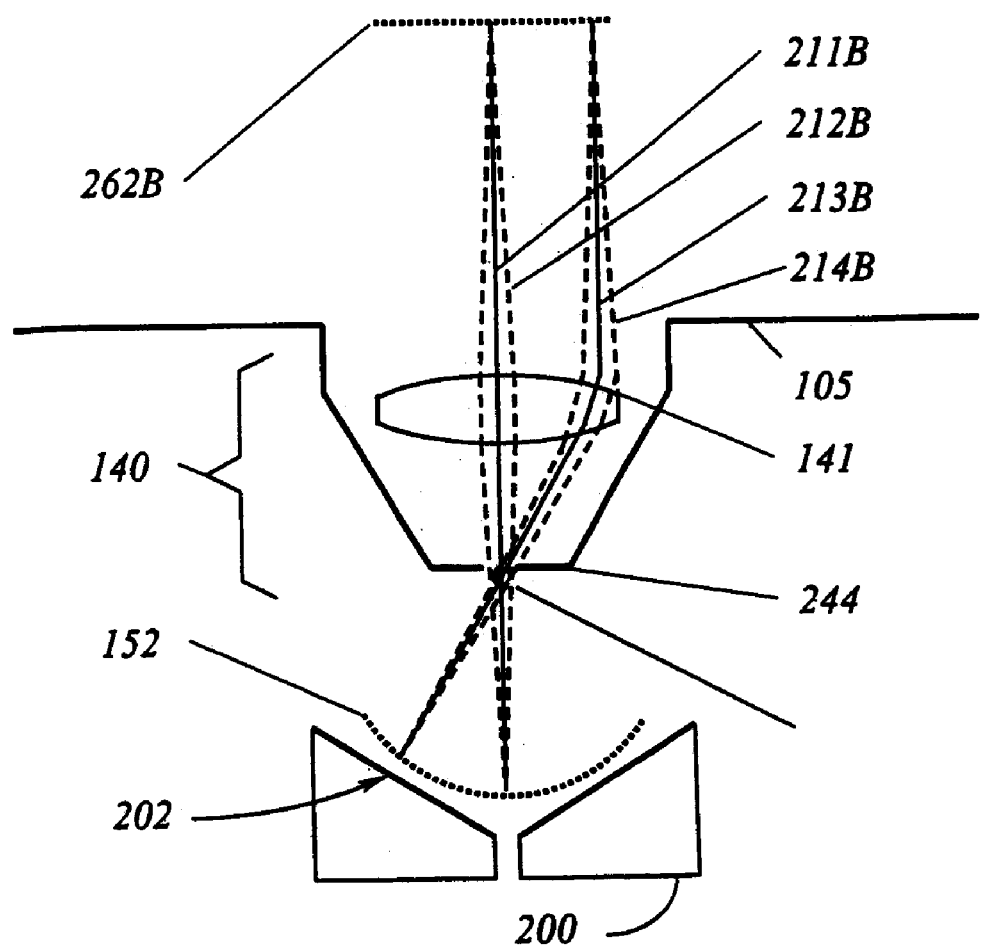
FIG. 2(b) shows alternative measurement optics for the sensor shown in FIG. 1.

FIG. 2(b) shows an alternative arrangement for measurement optics 140 without a collimating lens positioned at measurement datum point 150. Here, measurement optics 140 includes objective lens 141, which focuses chief rays 2111B and 213B to measurement point datum 150—in other words, measurement datum point 150 is located at the focal plane of objective lens 141. An aperture stop 244 is positioned at measurement datum point 150. Objective lens 141 focuses marginal rays 212B and 214B reflected from measurement surface 202 back to substantially flat intermediate real image 262B.

Figure 3:
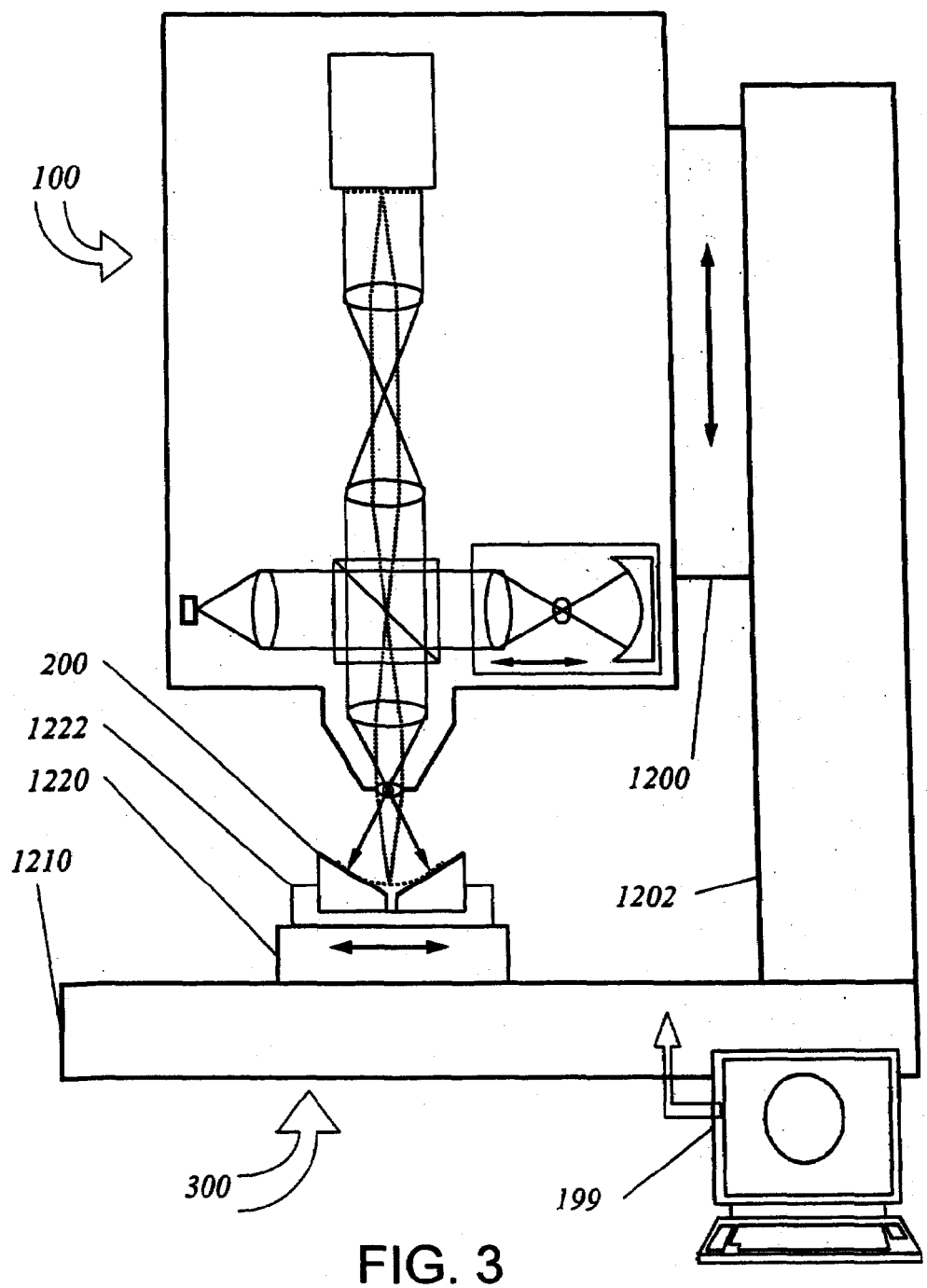
FIG. 3 is a schematic diagram of an interferometry system including the sensor of FIG. 1 and x,y,z staging.

Various system configurations are possible for mounting and positioning sensor 100. In FIG. 3, for example, interferometry system 300 includes sensor 100 mounted to a z stage 1200 (i.e., a vertical translation stage) on a pillar 1202 affixed to a base 1210. An x, y stage 1220, also affixed to base 1210, aligns a part fixture 1222 positioning part 200 with respect to sensor 100. Optionally, base 1210 includes tip-tilt staging (not shown) for adjusting the angular orientation of part 200 with respect to measurement optics 130. Computer 199 controls the entire system, including staging.

Figure 4:
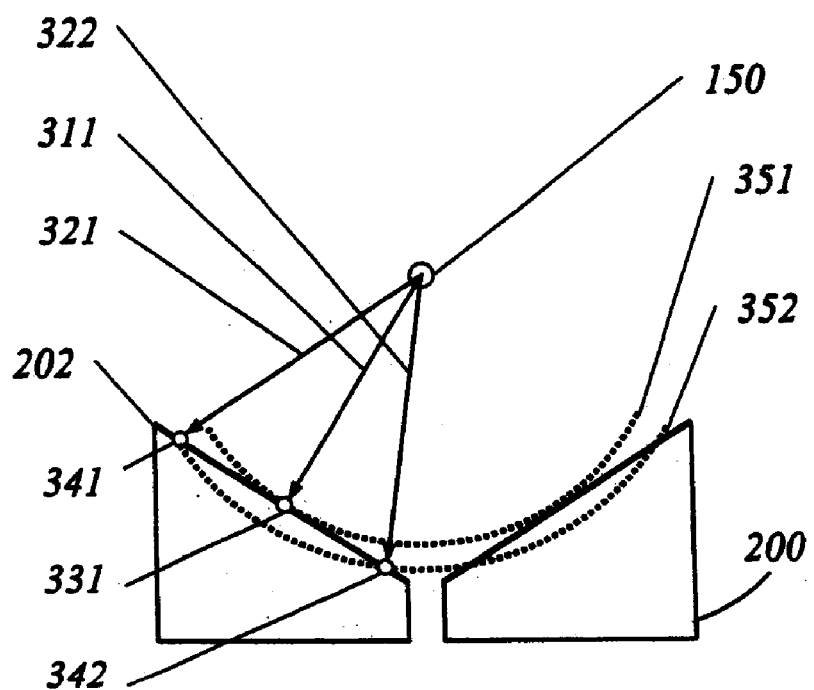
FIG. 4 is a schematic diagram illustrating the measurement concept for conical part surfaces.

Referring to FIG. 4, the local radius of curvature of the optical measurement surface is varied to contact conical part surface 202. The optical measurement surface is depicted contacting part surface 202 for two difference radii of curvature: first optical measurement surface 351 and second optical measurement surface 352. These positions of the optical measurement surface correspond to two different positions of OPD translation stage 134 (see FIG. 1). First optical measurement surface 351 contacts part surface 202 at intersection point 331. Also shown is a chief ray 311, which indicates the illumination and imaging path for intersection point 331. Note that chief ray 311 is substantially perpendicular to part surface 202 (i.e., the optical measurement surface tangentially contacts part surface 202 at point 331), which is the ideal condition for maximum light return and maximum sensitivity to deformations in part surface 202. Two additional intersection points 341 and 342 show where second optical measurement surface 352 makes optical contact with part surface 202. Here two chief rays 321 and 322 corresponding to intersection points 341 and 342 are at near to normal incidence but at different angles and having different lengths than chief ray 311.

Figure 5:
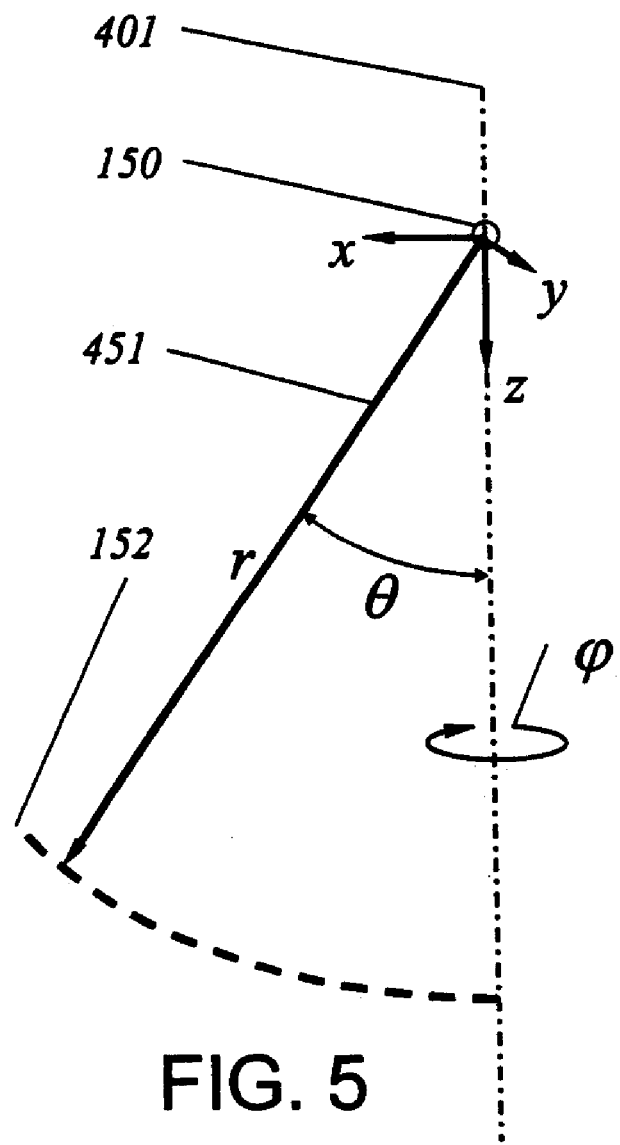
FIG. 5 shows the ray geometry and coordinate detail.
Figure 6:
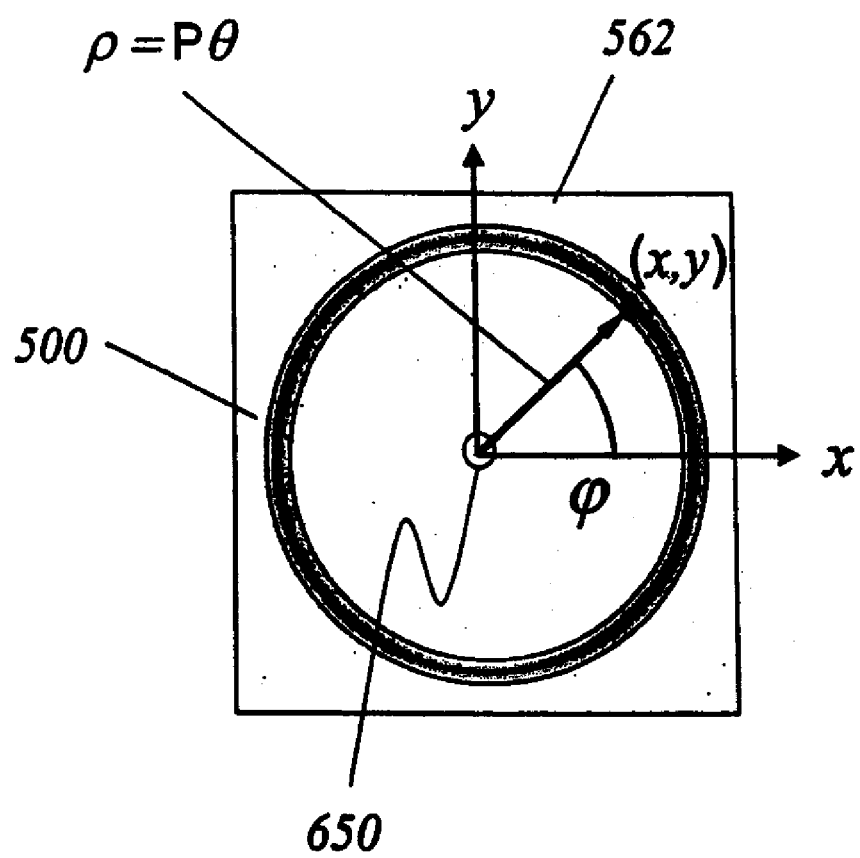
FIG. 6 shows the coordinate mapping to camera image.

FIG. 5 is a further detail drawing of the measurement geometry, showing the angles and lengths of a specific chief ray 451 similar to chief rays 321 and 322 shown in FIG. 4. We define the inclination or chief ray angle θ, the azimuthal angle φ, the ray length r from measurement datum point 150 to optical measurement surface 152, and the Cartesian coordinates x, y, z. When measurement surface 152 is substantially spherical, ray length r is the same as the radius of the corresponding virtual sphere. FIG. 6 shows how the chief ray angle, θ, and azimuthal angle, φ, maps onto a flat-field image 560 on a camera area 562. The mapping typically involves a coordinate transformation that may for example be $$\rho = P\theta \qquad (1)$$

where ρ is the radius on the camera image with respect to a central datum point projection 650 at the image and P is a substantially fixed scaling factor. Because the imaging system causes the chief ray angle, θ, to map to the same image radius while the OPD is varied, the magnification of the system is constantly changing during the scan of the optical measurement surface. This behavior is very different from the more common telecentric imaging, for which one seeks to maintain constant magnification for a range of object positions. The direct result from a measurement is therefore a collection of measured radii r as a function of the chief ray angle θ and azimuthal angles, φ. Many other mappings are possible, depending on the optical properties of sensor 100.

A variety of interferometric distance measurement techniques can be used to determine ray length r, including e.g., monochromatic and multiple-wavelength laser interferometry, phase-shifting interferometry, infrared interferometry, and low coherence interferometry.

Figure 7:
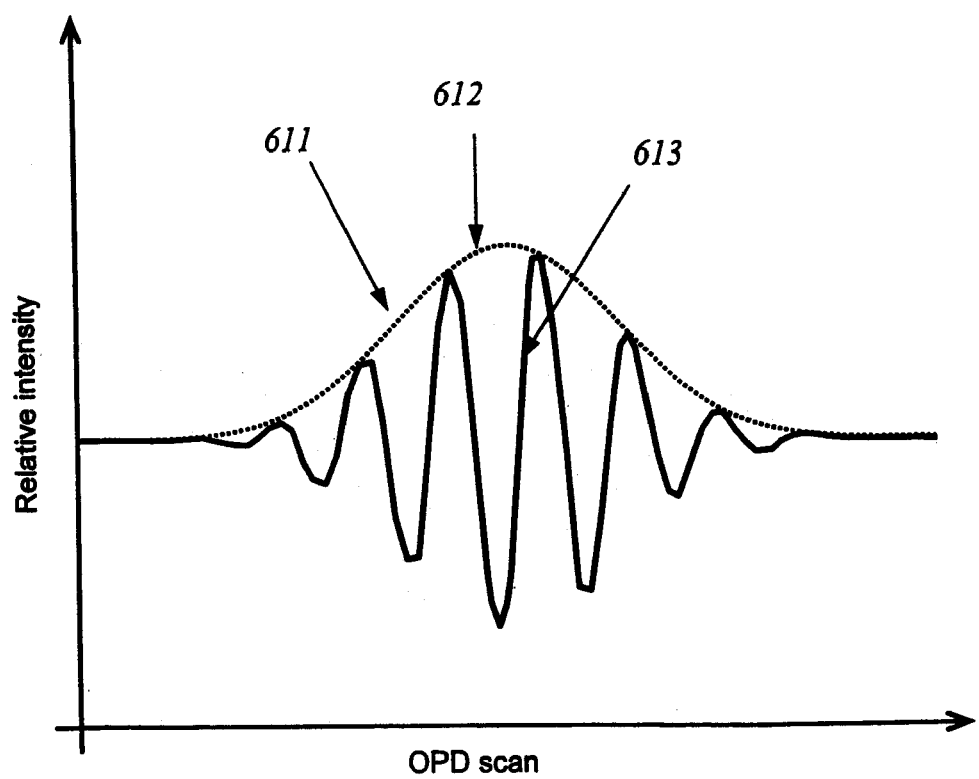
FIG. 7 is a plot of relative intensity of a pixel as a function of optical path difference (OPD)

In the low coherence interferometry approach, the measurement process is similar to that used with a scanning white light interferometer (SWLI). An example data set acquired for a single camera pixel using a SWLI process is shown in FIG. 7. The localization of an interference intensity signal 613 around the zero OPD position is characteristic of interferometry assuming that source 110 (see FIG. 1) is spectrally broadband, e.g., has a spectral bandwidth of 100 nm centered at 600 nm. The fringe localization provides a means for determining the precise moment when the optical measurement surface intersects the object point corresponding to the image pixel. The length scale of the fringe localization corresponds to the coherence length for the source. The scan motion is precisely controlled, so that knowledge of when a given object point is at zero OPD can be directly translated into a ray length r. By scanning over a range larger than the coherence length, one can observe the fringe localization. One can apply any of a variety of techniques for determining surface height using low-coherence sources. Suppose for example interference data for a first pixel looks as in FIG. 7, with a peak 612 in the fringe contrast 611 at a scan position of 0 μm. A second pixel might have a different fringe contrast peak at a different scan position, for example 10 μm. The difference in radius r between the two object points corresponding to these image pixels would therefore be 10 μm. The data processing involves, e.g., coherence envelope detection or frequency domain analysis, as described by T. Dresel, et al. in *Applied Optics* Vol. 31, pp.919–925 (1992) and U.S. Pat. No. 5,398,113, respectively.

Figure 8:
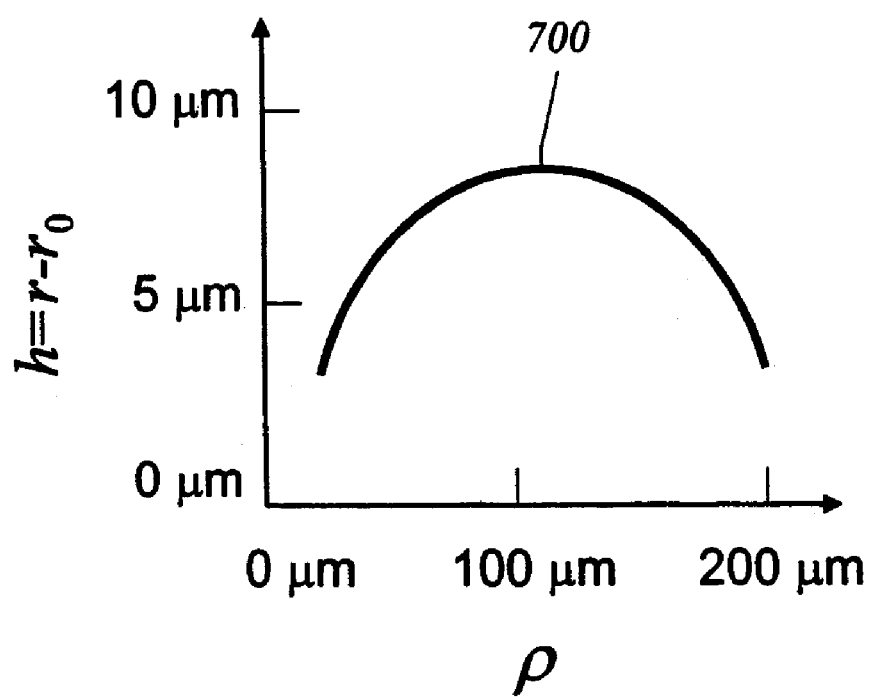
FIG. 8 is a plot showing a radial cross section profile through the height data.

Computer 199 records interference images while varying the OPD. From these images, computer 199 determines r(θ, φ) data. From this data, computer 199 generates radial height profiles along different azimuthal directions. Each datum in a radial height profile corresponds to the difference between part surface 202 and optical measurement surface 152 at a particular radius of curvature along a normal to optical measurement surface 152 at the particular radius of curvature. A radial height profile 700 is illustrated in FIG. 8.

Figure 9:
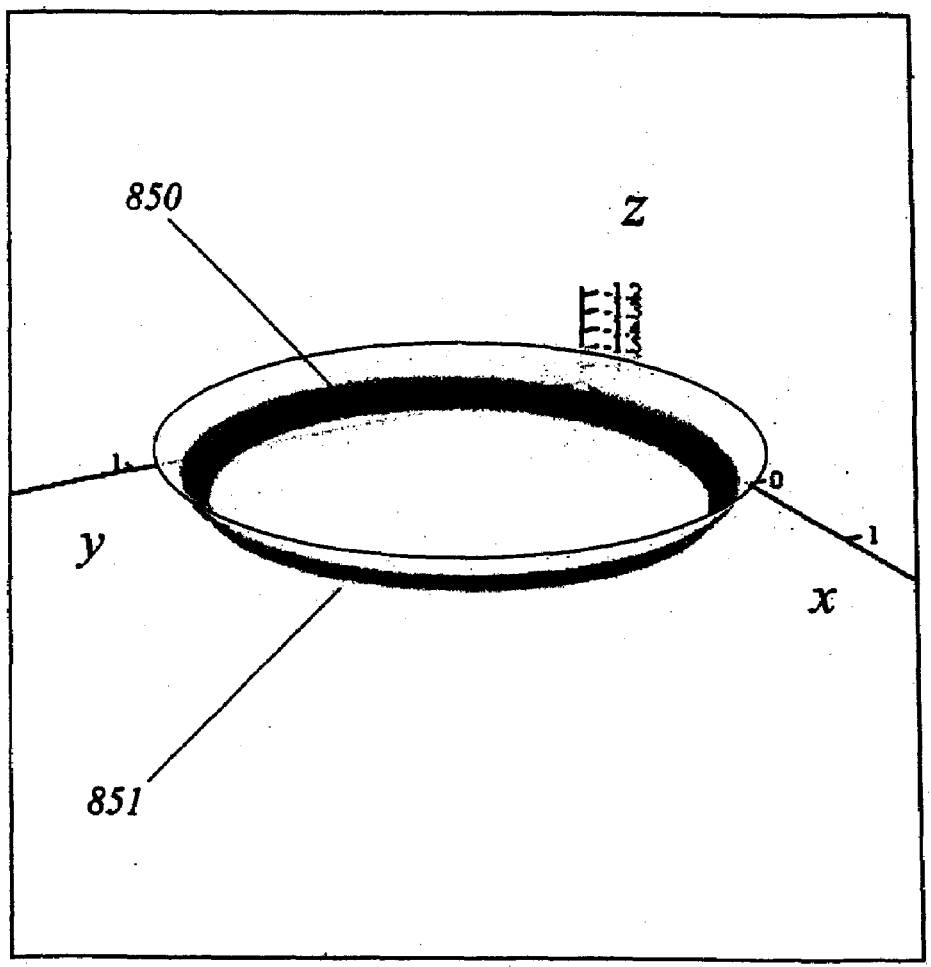
FIG. 9 is a 3D representation of acquired data using a Cartesian coordinate system.

Referring to FIG. 9, radial height profile data is transformed from the r, θ, φ coordinate system to a 3D representation 850 in a more familiar x, y, z Cartesian coordinate system, using e.g., $$x = r \sin(\theta)\cos(\theta)$$

$$y = r \sin(\theta)\sin(\phi)$$

$$z = -r \cos(\theta) \quad (2)$$

Figure 10:
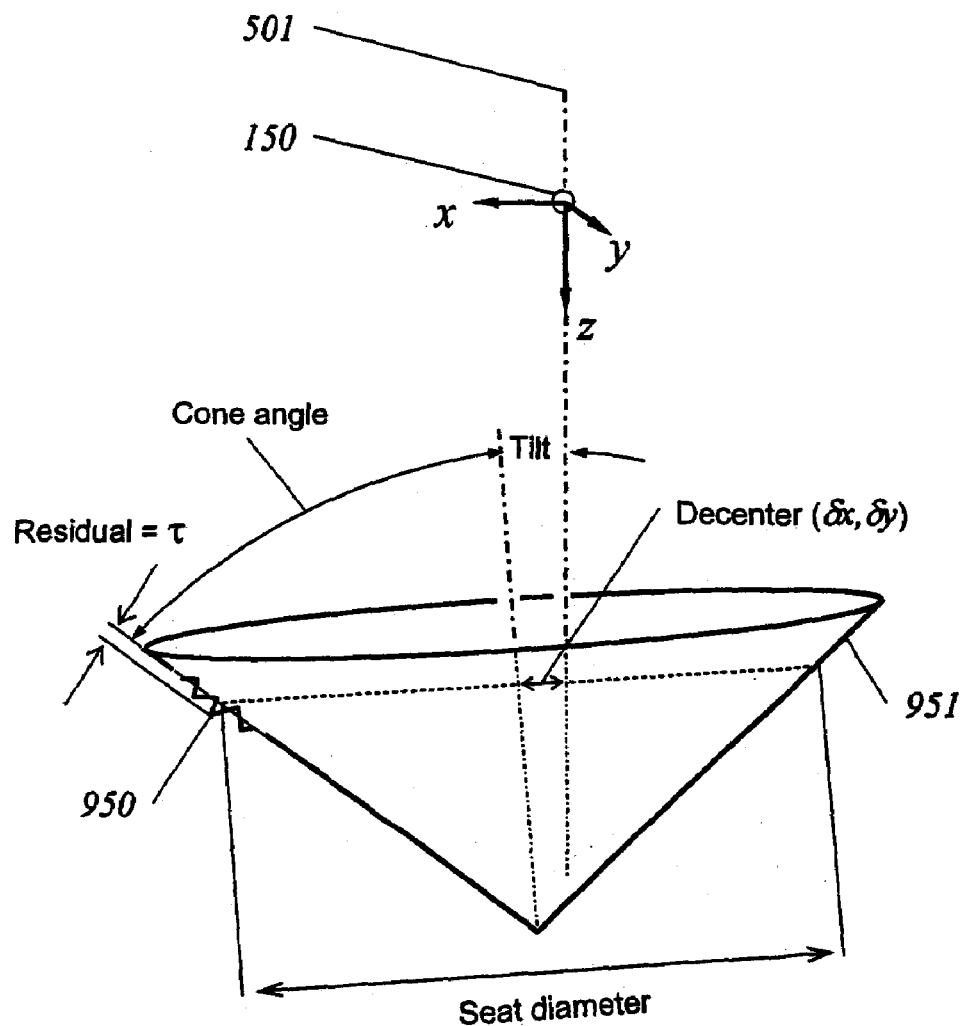
FIG. 10 shows parameters used when fitting a theoretical cone to data.

Using, e.g., a nonlinear least-squares fit, a best-fit theoretical surface 851 is fit to 3D representation 850. Several parameters are extracted from best-fit theoretical surface, including cone angle, decenter of the cone with respect to the instrument optical axis, axis orientation (i.e., tilt) with respect to the instrument optical axis, and location of a specific diameter, e.g. a valve seat diameter, with respect to the 3D representation 850. Referring to FIG. 10, a residual profile τ is also calculated with respect to the best-fit theoretical cone 951 corresponding to a 3D data set 950. The residual profile is the deviation of measured part surface 202 from best-fit theoretical surface 851.

Figure 11:
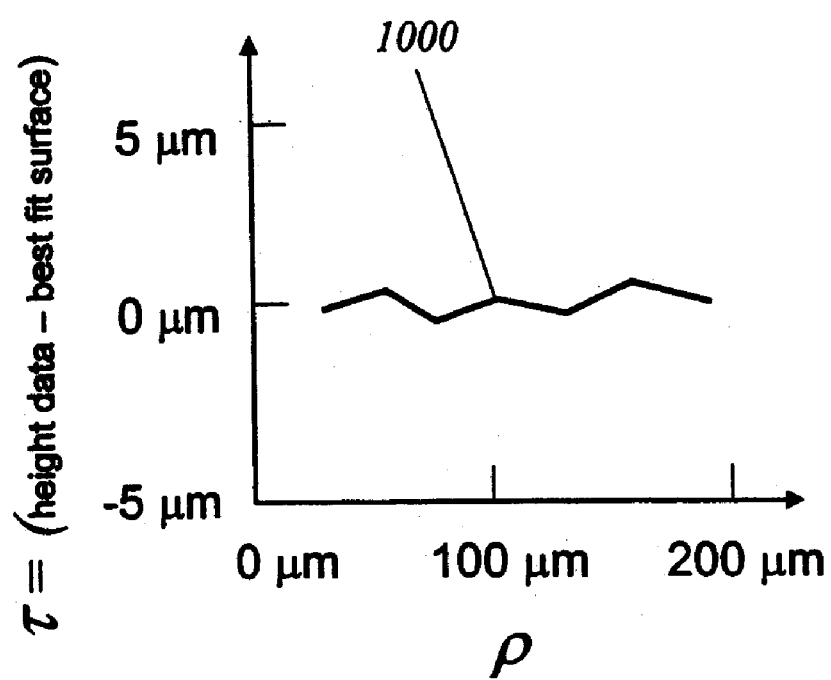
FIG. 11 is a plot showing a radial cross section profile through residual data, after subtraction of best-fit cone.

Once the τ(θ, φ) data are generated by the preceding analysis, a data cross-section in an azimuthal direction shows a deviation profile 1000 as illustrated in FIG. 11. A deviation profile is the difference between part surface 202 and the theoretical best-fit cone to height data representative of part surface 202.

Figure 12:
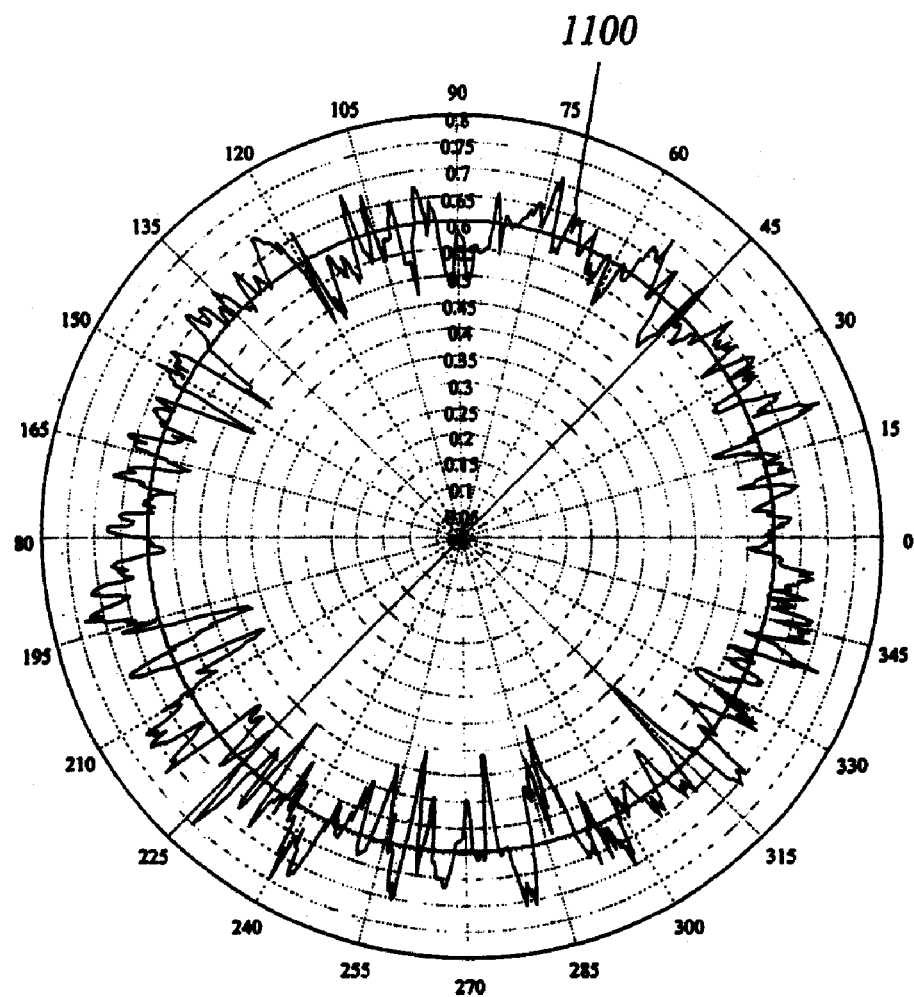
FIG. 12 is a plot showing a roundness profile of residuals (after fit subtraction)

Referring to FIG. 12, computer 199 also determines the deviation of the part surface from the best-fit cone for a circular slice through the best-fit cone at a selected diameter value. The resulting roundness profile is a familiar format to users of stylus gages. This profile represents the variation in length of normal-incidence vectors originating at a virtual datum point on the axis of the best-fit cone. Equivalently, the straightness profile shown in FIG. 11 represents the deviation of the part surface from the ideal fitted conical surface.

Additional embodiments and features for the radius of curvature scan are disclosed in commonly-owed U.S. Patent Application Publication US-2003-00117, the contents of which are incorporated herein by reference. Generally, the embodiments disclosed for generating the radius of curvature scan of the optical measurement surface involve refractive optics either in a fixed or translatable configuration. These designs can be quite expensive to produce, particularly when the cone angle becomes small (closer to that of a cylinder).

A different design for generating a radius of curvature scan of the optical measurement surface uses an auxiliary optic having a curved reflective surface to adapt a conventional interference objective to provide a radius of curvature scan of a locally spherical optical measurement surface. The conventional interference objective may be, for example, of the Michelson or Mirau type. For example, in one embodiment, the auxiliary optic is a spherical mirror attached to a supporting structure so that it can be manipulated within the field of view of the objective. Alignment of the part with respect to the spherical mirror is accomplished by mechanical fixturing and/or by using the interferometer output as position feedback. In another embodiment, the auxiliary optic is a spherical ball, such as a precision ball bearing, that is placed in direct or near contact with the object surface. The mirror-like surface of the ball deflects the measurement beam into a spherical measurement surface. No alignment is required since the ball self-centers on the object surface. In either example, the reference mirror in the interference objective can be repositioned to compensate for the focusing properties of the auxiliary optic to achieve a high-contrast low coherence interferometry signal. We now described these embodiments in greater detail.

Figure 13:
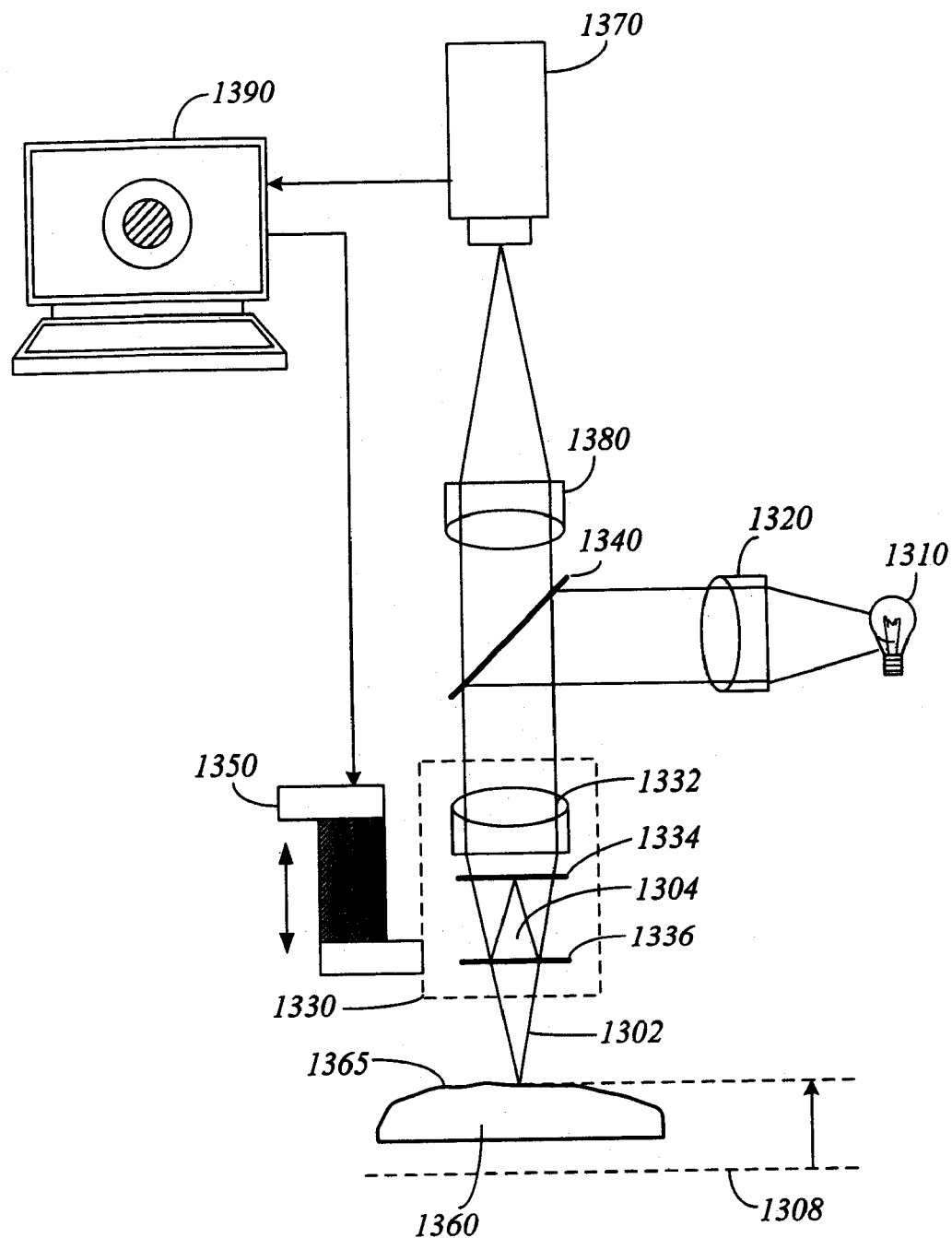
FIG. 13 is a schematic drawing of a conventional low-coherence scanning interferometer using a Mirau-type interference objective.

A conventional scanning interferometric microscope system 1300 is shown schematically in FIG. 13. System 1300 includes a low-coherence light source 1310, a first optical system 1320 (e.g., a lens) for collecting light from the light source, an interference objective 1330, a beam splitter 1340 for directing light from the source to the interference objective, a translation stage (e.g., utilizing a piezoelectric transducer) 1350 coupled to the interference objective to adjust the position of the interference objective relative to a test part 1360 having a measurement surface 1365, a detector (e.g., a camera having multiple detection elements) 1370, a second optical system 1380 (e.g., a lens) for use in imaging light reflected from the measurement surface onto the detector, and a computer 1390 coupled to the detector and the translation stage.

Interference objective 1330 includes an objective lens 1332, a reference surface 1334, and a beam splitter 1336 for separating the light from the light source into a measurement wavefront 1302 that is directed to reflect from the measurement surface and a reference wavefront 1304 that is directed to reflect from the reference surface. As described above, the paths for the measurement and reference wavefronts define an optical measurement surface corresponding to a theoretical test surface that would reflect the measurement wavefront to produce a zero optical path length difference between the measurement and reference wavefronts. Objective lens 1332 and optical system 1380 direct the measurement wavefront reflected from the measurement surface and the reference wavefront reflected from the reference surface onto the detector (with the wavefronts being transmitted by beam splitter 1340), where they interfere with each other to produce an optical interference pattern. Objective lens 1332 and optical system 1380 are positioned so that the measurement surface is in the position of best focus when nominally contacted by the optical measurement surface. Similarly, optical system 1320 and objective lens 1332 nominally image an effective light source onto the measurement and reference surfaces (with the light being reflected by beam splitter 1340). In some embodiments, an adjustable aperture stop (not shown) may be used to adjust the numerical aperture of the light used to illuminate the measurement and reference surfaces.

Scanning the position of the interference objective relative to the measurement surface translates the position of an optical measurement surface relative to the measurement surface to provide low coherence interferometry data. The data can be analyzed to obtain the surface profile of the measurement surface relative to an optical datum 1308. The collection of these data, and its analysis is substantially the same as that described above.

Figure 14:
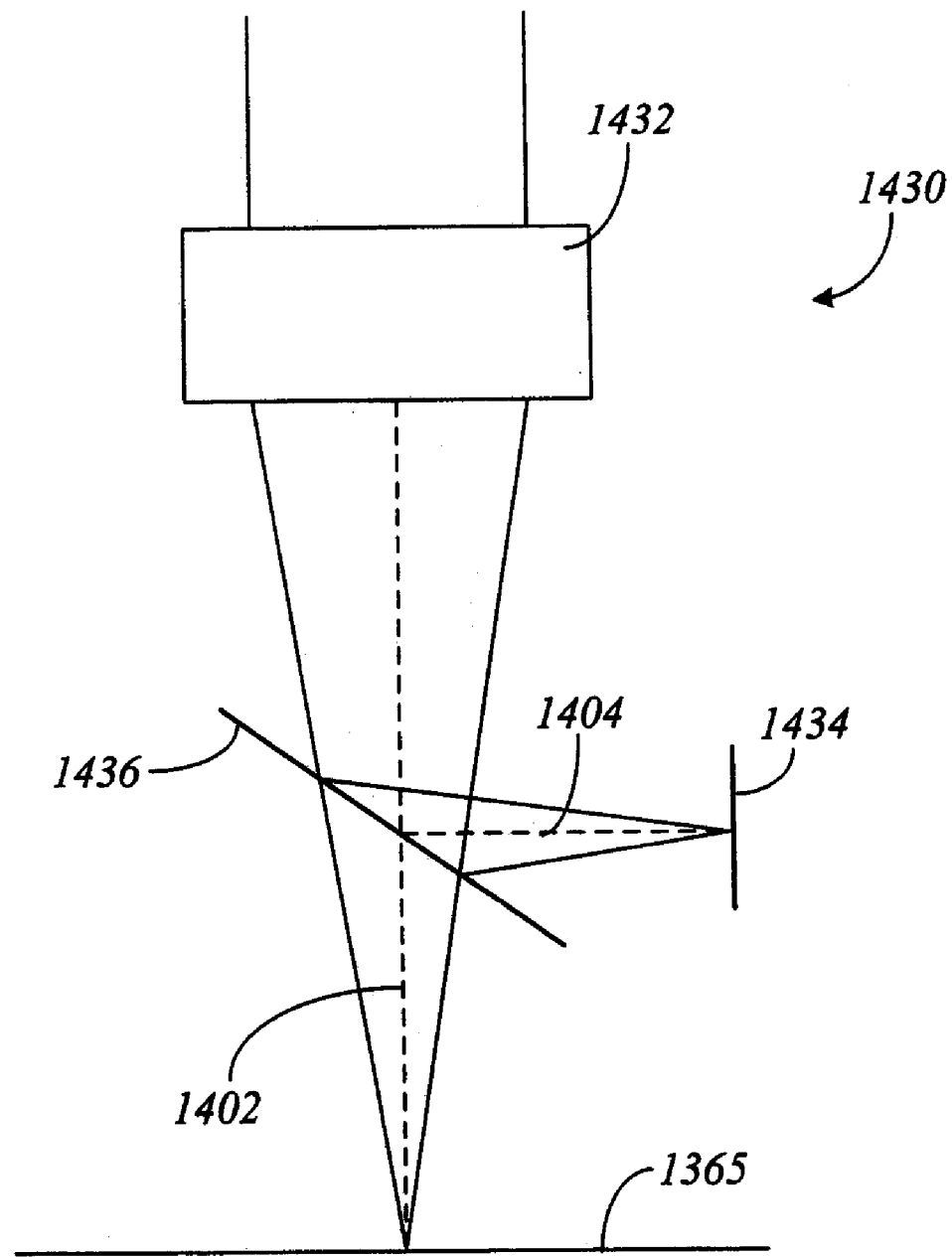
FIG. 14 is a schematic drawing of Michelson-type interference objective.

The interference objective shown in FIG. 13 is of the Mirau type. In other embodiments, the interference objective can be of the Michelson type, such as is shown in FIG. 14. Referring to FIG. 14, a Michelson interference objective 1430 includes an objective lens 1432, a reference surface 1434, and a beam splitter 1436. These elements function similarly to those of the Mirau interference objective 1330, except that in this case, beam splitter 1436 directs the reference wavefront 1404 away from (e.g., to the side of) the optical axis of the measurement wavefront 1402.

Using the exact configuration shown in FIG. 13, however, the optical measurement surface is a nominally flat surface (corresponding to the shape of reference surface 1334) and the scan simply translates that flat optical measurement surface. To produce a measurement wavefront having a locally spherical portion and a scan that varies the radius of curvature of that locally spherical portion, system 1300 can be modified to include an auxiliary optic having a curved reflective surface that redirects the measurement wavefront to the measurement surface and causes the measurement wavefront to have a locally spherical portion that can be positioned to contact the measurement surface (e.g., a conical measurement surface). Furthermore, by using the translation stage to translate the interference objective relative to the auxiliary optic, the radius of curvature of that locally spherical portion can be varied.

Figure 15:
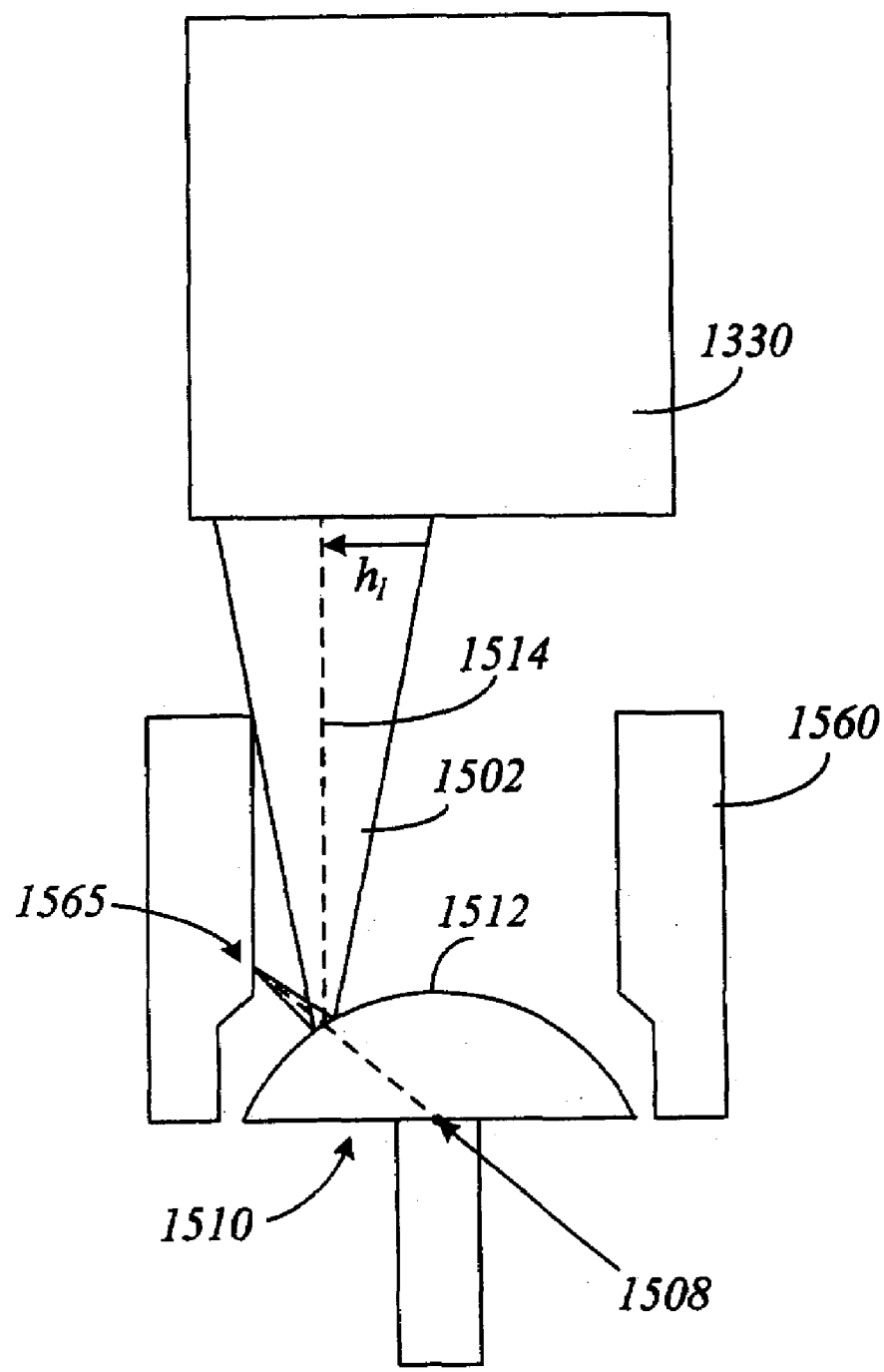
FIG. 15 is a schematic drawing of one embodiment of an auxiliary optic for use with the low-coherence scanning interferometer of FIG. 13.

One embodiment of the auxiliary optic is shown in FIG. 15. A spherically curved surface 1512 of an auxiliary optic 1510 redirects the measurement wavefront 1502 to a conical measurement surface 1565 of a cylindrical test object 1560. The spherically curved surface of the auxiliary optic produces a locally spherical optical measurement surface centered at a point datum 1508 that is positioned approximately one-half of the radius of curvature of the spherical surface upwards from the center of curvature of the spherical surface. In this embodiment, the curved surfaces reverses the direction of the measurement wavefront, and is therefore most useful when the apex of the conical measurement surface is virtual, in other words, when there is a "through hole" in the measurement part. The auxiliary optic may be moved about to examine other parts of the measurement surface, or to construct by "stitching" a larger composite image. The optic may be entirely detached from the microscope objective, or may be carried with it, depending on the mode of measurement.

Data acquisition is can be performed by moving the interference objective along its optical axis to generate an optical path difference scan. By scanning the position of the interference objective relative to the auxiliary optic, the optical measurement surface grows relative to its normal, thereby changing its radius of curvature to cause it to contact and pass through the measurement surface of the test part. The radius of curvature of the optical measurement surface can also be varied by keeping the object surface and interference objective stationary and scanning the auxiliary optic along its axis of symmetry. Furthermore, in some embodiments, one can translate the locally spherical optical measurement surface to contact and pass through the measurement surface by translating the test part relative to the auxiliary optic.

The following equation may be used to select an appropriate radius of curvature R for the spherically curved surface of the auxiliary optic:

$$R = \frac{h_1}{\sin\left(\frac{\pi - \theta}{4}\right)}, \quad (3)$$

where $h_1$ is the distance of a chief ray 1514 from the optical axis, where the chief ray is selected according to the field of view of the interference objective (e.g., 2 $h_1$ could be set to half the field of view (FOV)), and where $\theta$ is the included angle defined by the conical measurement surface.

Ray trace simulation shows that the lateral resolution of the imaging system improves as the chief ray distance $h_1$ gets closer to the radius of inspection, which decreases with the distance between the measurement surface and the spherical mirror. Specifically, when this distance decreases, there are two effects: the numerical aperture (NA) at the conical surface increases, thus generating a smaller diffraction spot, and the aberrations are reduced because the magnification by the spherical mirror gets closer to 1. The limit case is when the chief ray height is equal to the radius of inspection. In this case the spherical mirror contacts the seat and there are no aberrations introduced by the spherical mirror. In practice, the available field of view of the objective and the amount of vignetting due to the test part will constrain the chief ray height $h_1$ to be less than the inspection radius.

The curved surface of the auxiliary optic will affect the magnification of the imaging of the reflected measurement wavefront to the camera. Accordingly, the position of the camera and/or imaging optics should be adjusted to ensure that the measurement surface is in focus at the camera. In cases where the auxiliary optic causes the measurement surface to be imaged with a magnification different than that of the reference surface, the optical path in the reference leg of the interferometer should also be adjusted, for example, by adjusting the position of the reference surface in the interference objective, in order to yield high-contrast fringes when the part is in focus at the detector plane. The adjustment is done to account for the different spatial frequency components in the interference signal produced by the different illumination directions created by an extended source. Accordingly, fringe contrast can also be improved by controlling the size of the illumination source with an aperture stop. Alternatively, the reference leg of the interferometer can be configured to include optics introducing the same magnification as that produced by the auxiliary optic.

Figure 16:
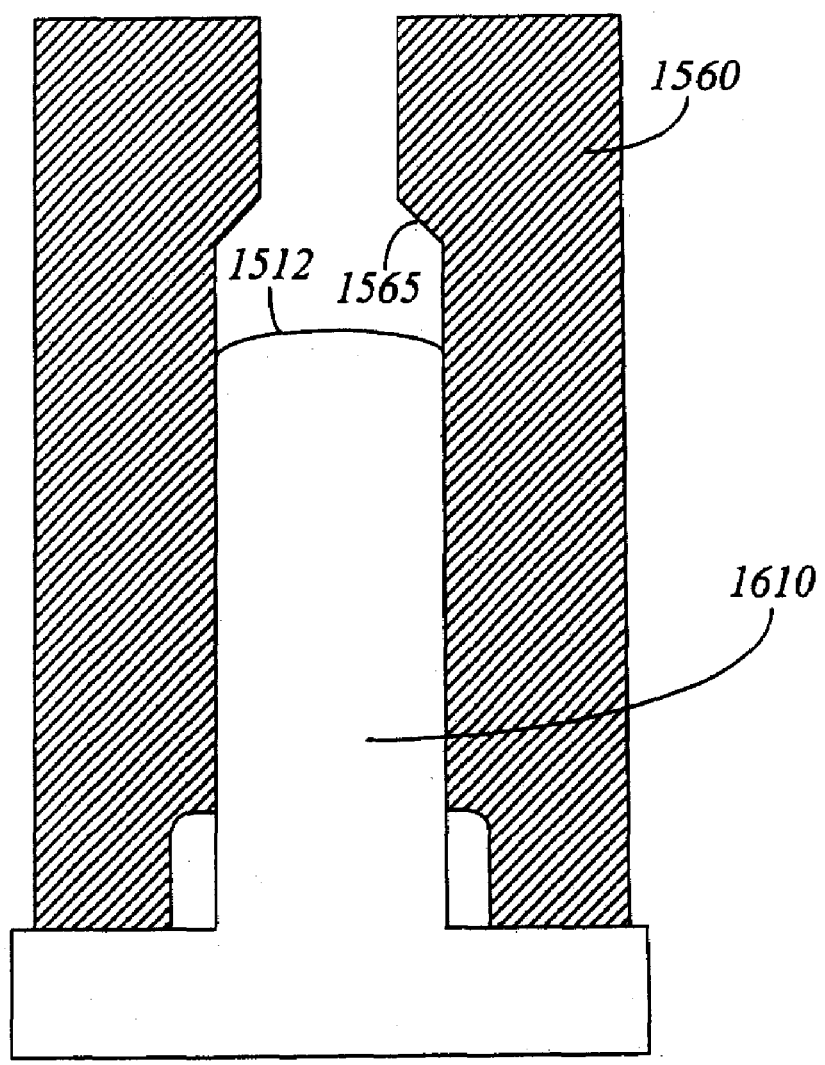
FIG. 16 is a schematic drawing of a mechanical fixture for aligning the auxiliary optic of FIG. 15 with the test part.

The test part is aligned with respect to the auxiliary optic within the usable range of the interferometer. Some machined parts have external datums that can be used for precise fixturing of the part. In this case, mechanical positioning in a fixture may be sufficient to bring the part in adequate alignment with the diverter. For example, as illustrated in FIG. 16, in some embodiments, the curved reflective surface 1512 of the auxiliary optic is mounted on an insert (e.g., a pedestal) 1610 that slides into a guiding bore of the test part 1560 having the conical measurement surface. Preferably, the insert is configured to self-center mechanically in the bore. Any part decenter can be measured with respect to the datum point created by the spherical mirror. To minimize decenter, the center of curvature of the mirror should be aligned with the axis of the mechanical insert.

Furthermore, data derived from the interferometer measurement can provide information about the location of the part (tip/tilt, decenter and axial location) that can be used as a feedback signal for a mechanical positioning system (manual or automated stages for example). For example, the location of the datum point for the auxiliary optic in the field of view can be determined by scanning the microscope objective so that the system profiles the curved surface of the auxiliary optic. In other words, the translation stage scans the optical measurement surface through the curved surface. The apex of the spherical surface can be derived from the topography measurement. By construction, the datum point is aligned with the sphere apex along the optical axis of the microscope objective. A reference test part having a known conical surface may also be used to calibrate the angle mapping by the optical system.

Figure 17:
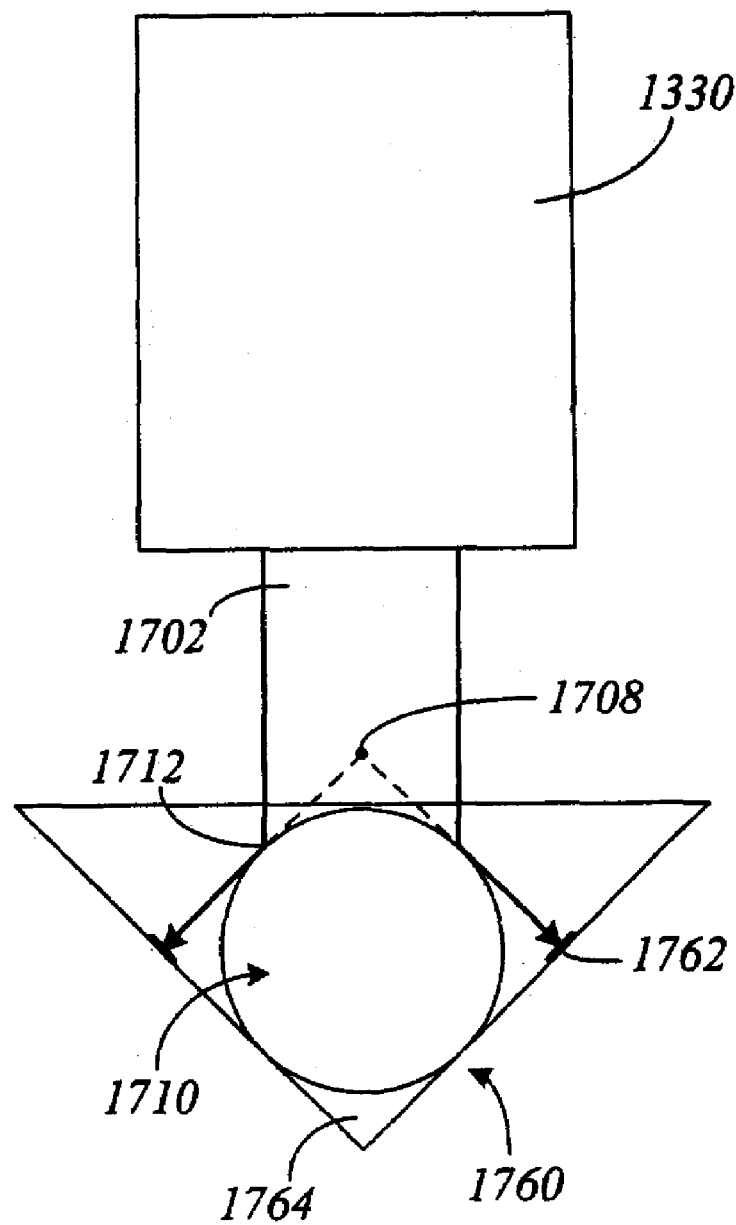
FIG. 17 is a schematic drawing of another embodiment of an auxiliary optic for use with the low-coherence scanning interferometer of FIG. 13.

In another embodiment shown in FIG. 17, the auxiliary optic can be an object 1710, such as a ball, that self-centers in a recess 1764 provided by a test part 1760 having a conical measurement surface 1762. As in the embodiment of FIG. 15, the auxiliary optic has a curved reflective surface 1712 that redirects the measurement wavefront 1702 between the interference objective 1330 and the measurement surface 1762. In the specific embodiment shown in FIG. 17, the datum point 1708 for the spherical optical measurement surface is between the interference objective and curved surface of the auxiliary optic. Like the embodiment of FIG. 15, the datum point and information about the position of the curved surface of the auxiliary optic can be obtained by scanning the optical measurement surface to profile the curved surface of the auxiliary optic itself. Unlike the embodiment of FIG. 15, the test part does not require a through hole.

Figure 18:
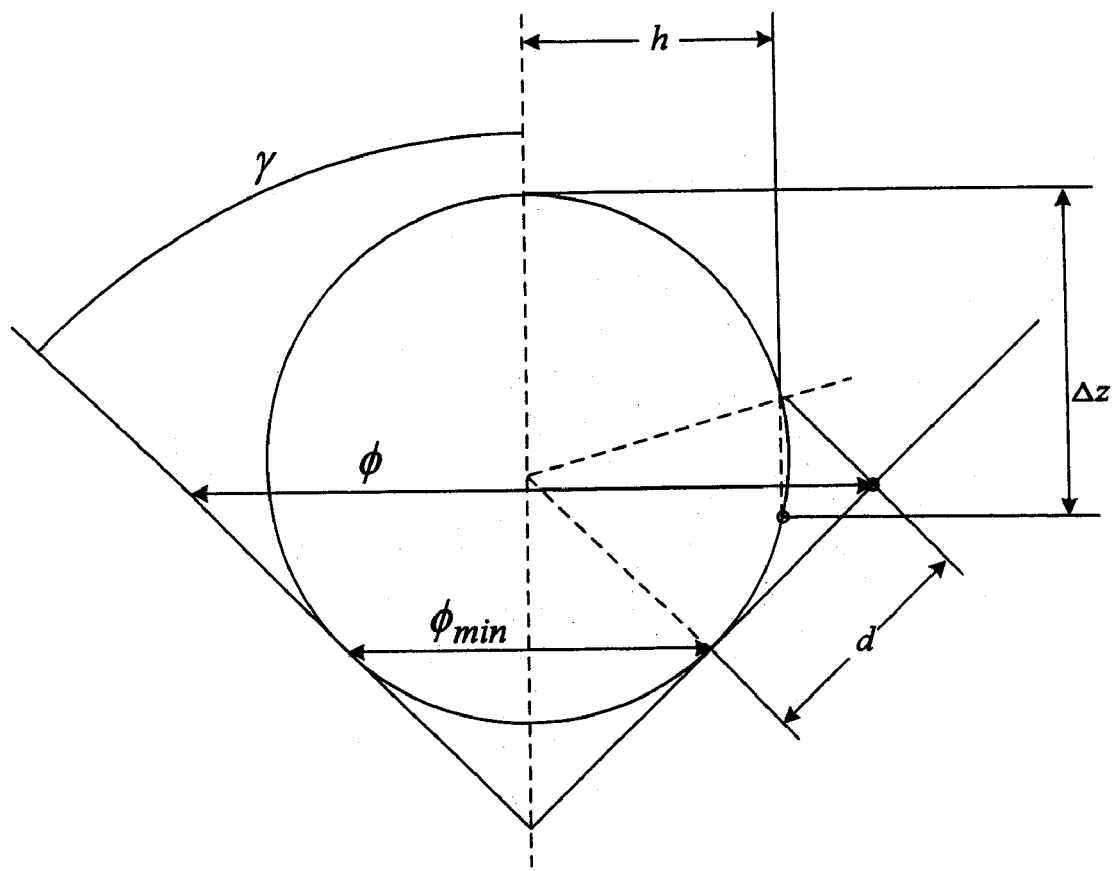
FIG. 18 is another schematic drawing of the auxiliary optic of FIG. 17.

Referring now to FIG. 18, for the specific case where the auxiliary optic is a ball, the inspection diameter $\phi$ and the included cone angle $2\gamma$ determine the ball radius of curvature $\rho$ and the nominal height h at which the part will be observed by the optical system according to the following equations:

$$\rho = \frac{\phi}{2}\left(\cos\gamma + \sin\gamma\cos\left(\frac{\gamma}{2} - \frac{\pi}{4}\right)\right)^{-1}, \text{ and} \quad (4)$$

$$h = \rho\sin\left(\frac{\gamma}{2} + \frac{\pi}{4}\right). \quad (5)$$

Finally, we note that the embodiments of the invention are not limited to illumination wavelengths in the visible. For example, long wavelength (e.g., infrared, such as 0.75–12 µm) interferometry techniques can also be used in the aforementioned methods and systems.

By using a longer source wavelength one can also establish a limited measurement volume where there is reduced distance uncertainty to the point datum, again by establishing this volume near a calibration sphere. In this case, a single-phase measurement may be sufficient. Moreover, surfaces that diffusely reflect visible wavelengths or light can appear specular to longer wavelengths. Hence, long wavelength sources can be used to characterize rough surfaces. Of course, for long wavelength interferometry, the system detector and optical components should be selected to perform appropriately at the light source wavelength. Long wavelength interferometry techniques are further described in U.S. Pat. No. 6,195,168, entitled "INFRARED SCANNING INTERFEROMETRY APPARATUS AND METHOD," to Xavier Colonna de Lega et al.

A number of embodiments of the invention have been described. Nevertheless, it will be understood that various modifications may be made without departing from the spirit and scope of the invention. For example, although described in the context of a conical valve surface, the invention also applies to other complex surface shapes, including, e.g., alternative valve seat geometries, countersunk holes and chamfers, non-conical but cylindrically shaped surfaces, and intersections of surfaces, such as a cylinder and a cone, or a sphere and a cone. Accordingly, other embodiments are within the scope of the following claims.

What is claimed is:

1. An apparatus comprising:
   an interferometer positioned to derive measurement and reference wavefronts from a source of electromagnetic radiation, wherein the interferometer is configured to direct the measurement wavefront to reflect from a measurement surface and the reference wavefront to reflect from a reference surface, and further directs reflected measurement and reflected reference wavefronts to overlap with one another and to form an interference pattern;
   an auxiliary optic having a curved reflective surface positioned to redirect the measurement wavefront between the interferometer and the measurement surface; and
   a translation stage,
   wherein paths for the measurement and reference wavefronts define an optical measurement surface corresponding to a theoretical test surface that would reflect the measurement wavefront to produce a zero optical path length difference between the measurement and reference wavefronts, and
   wherein the translation stage is configured to scan the optical measurement surface over the measurement surface.

2. The apparatus of claim 1, wherein the curved reflective surface of the auxiliary optic causes the optical measurement surface to have a locally spherical portion.

3. The apparatus of claim 2, wherein the translation stage is configured to vary a radius of curvature of the locally spherical portion of the optical measurement surface to contact the measurement surface.

4. The apparatus of claim 3, further comprising the source of the electromagnetic radiation, wherein the source defines a coherence length for the electromagnetic radiation, and wherein the translation stage is configured to vary the radius of curvature over a distance greater than the coherence length of the source.

5. The apparatus of claim 1, further comprising the source of the electromagnetic radiation.

6. The apparatus of claim 1, further comprising a detector positioned to detect the interference pattern.

7. The apparatus of claim 1, wherein the curved reflective surface of the auxiliary optic is a spherical surface.

8. The apparatus of claim 1, wherein the curved reflective surface of auxiliary optic is positioned to redirect the measurement wavefront in a direction having a component back to the interferometer.

9. The apparatus of claim 8, wherein the auxiliary optic is supported on a pedestal configured to slide into a guiding bore of a test part having the measurement surface.

10. The apparatus of claim 9, wherein the measurement surface is a conical surface positioned above the guiding bore between the curved reflective surface and the interferometer.

11. The apparatus of claim 1, wherein the translation stage is further configured to scan the optical measurement surface to contact the curved reflective surface of the auxiliary optic.

12. The apparatus of claim 1, wherein the auxiliary optic is configured to rest within a recess of a test part having the measurement surface.

13. The apparatus of claim 12, wherein the auxiliary optic is shaped relative to the recess to self-center in the recess.

14. The apparatus of claim 13, wherein the auxiliary optic is a ball.

15. The apparatus of claim 1, wherein the interferometer comprises an interference objective, and wherein the translation stage is configured to translate the interference objective relative to the auxiliary optic.

16. The apparatus of claim 15, wherein the translation stage is configured to translate the interference objective.

17. The apparatus of claim 15, wherein the translation stage is configured to translate the auxiliary optic.

18. The apparatus of claim 15, wherein the interference objective is a Mirau interference objective.

19. The apparatus of claim 15, wherein the interference objective is a Michelson interference objective.

20. The apparatus of claim 1, wherein the translation stage is configured to translate the auxiliary optic relative to the measurement surface.

21. An apparatus comprising:
a source of electromagnetic radiation, wherein the source defines a coherence length for the electromagnetic radiation;
a detector;
an interferometer having an interference objective positioned to derive measurement and reference wavefronts from a source of electromagnetic radiation, wherein the interference objective is configured to direct the measurement wavefront to reflect from a measurement surface and the reference wavefront to reflect from a reference surface, and wherein the interferometer directs reflected measurement and reflected reference wavefronts to overlap with one another and to form an interference pattern on the detector;
an auxiliary optic having a curved reflective surface positioned to redirect the measurement wavefront between the interferometer and the measurement surface; and
a translation stage;
wherein paths for the measurement and reference wavefronts define an optical measurement surface corresponding to a theoretical test surface that would reflect the measurement wavefront to produce a zero optical path length difference between the measurement and reference wavefronts,
wherein the curved reflective surface of the auxiliary optic causes the optical measurement surface to have a locally spherical portion, and
wherein the translation stage is configured to translate the interference objective relative to the auxiliary optic to vary a radius of curvature of the locally spherical portion of the optical measurement surface to contact the measurement surface and to vary the radius of curvature over a distance greater than the coherence length of the source.

22. A method comprising:
directing a measurement wavefront to reflect from a measurement surface and a reference wavefront to reflect from a reference surface, the measurement and reference wavefronts being derived from a common source of electromagnetic radiation;
directing the reflected measurement and reference wavefronts to overlap with one another and form an interference pattern, wherein paths for the measurement and reference wavefronts define an optical measurement surface corresponding to a theoretical test surface that would reflect the measurement wavefront to produce a zero optical path length difference between the measurement and reference wavefronts; and
varying the radius of curvature of a locally spherical portion of the optical measurement surface to contact the measurement surface, and detecting the interference pattern as a function of the radius of curvature,
wherein an auxiliary optic having a curved reflective surface is used to redirect the measurement wavefront to the measurement surface.

23. The method of claim 22, wherein the optical measurement surface contacts a conical portion of the measurement surface.

24. The method of claim 22, wherein the source defines a coherence length for the electromagnetic radiation, and wherein the radius of curvature is varied over a range larger than the coherence length of the source.

25. The method of claim 22, wherein the radius of curvature is varied by translating an interference objective used to generate the measurement and reference wavefronts relative to the auxiliary optic.

26. The method of claim 22, further comprises passing the auxiliary optic into a guiding bore of a test part having the measurement surface.

27. The method of claim 26, wherein the measurement surface is a conical surface positioned above the guiding bore between the curved reflective surface and the interferometer.

28. The method of claim 22, further comprising scanning the optical measurement surface to contact the curved reflective surface of the auxiliary optic.

29. The method of claim 22, further comprising resting the auxiliary optic within a recess of a test part having the measurement surface to self-center the auxiliary optic relative to the measurement surface.

30. The method of claim 29, wherein the auxiliary optic is a ball.

* * * * *

UNITED STATES PATENT AND TRADEMARK OFFICE
CERTIFICATE OF CORRECTION

| | | |
|---|---|---|
| PATENT NO. | : 7,212,291 B2 | Page 1 of 1 |
| APPLICATION NO. | : 11/017632 | |
| DATED | : May 1, 2007 | |
| INVENTOR(S) | : Xavier Colonna De Lega and Charles McFee | |

It is certified that error appears in the above-identified patent and that said Letters Patent is hereby corrected as shown below:

<u>Column 7</u>
Line 53, replace "2111B" with --211B--

Signed and Sealed this

Twenty-ninth Day of July, 2008

JON W. DUDAS
*Director of the United States Patent and Trademark Office*